Dec. 22, 1959
M. F. NATHAN
2,918,424
RECOVERY OF CATALYST FINES ENTRAINED IN THE REACTION
EFFLUENT AND REGENERATION EFFLUENT GASES FROM
A HYDROCARBON CONVERSION PROCESS
Filed Nov. 25, 1955
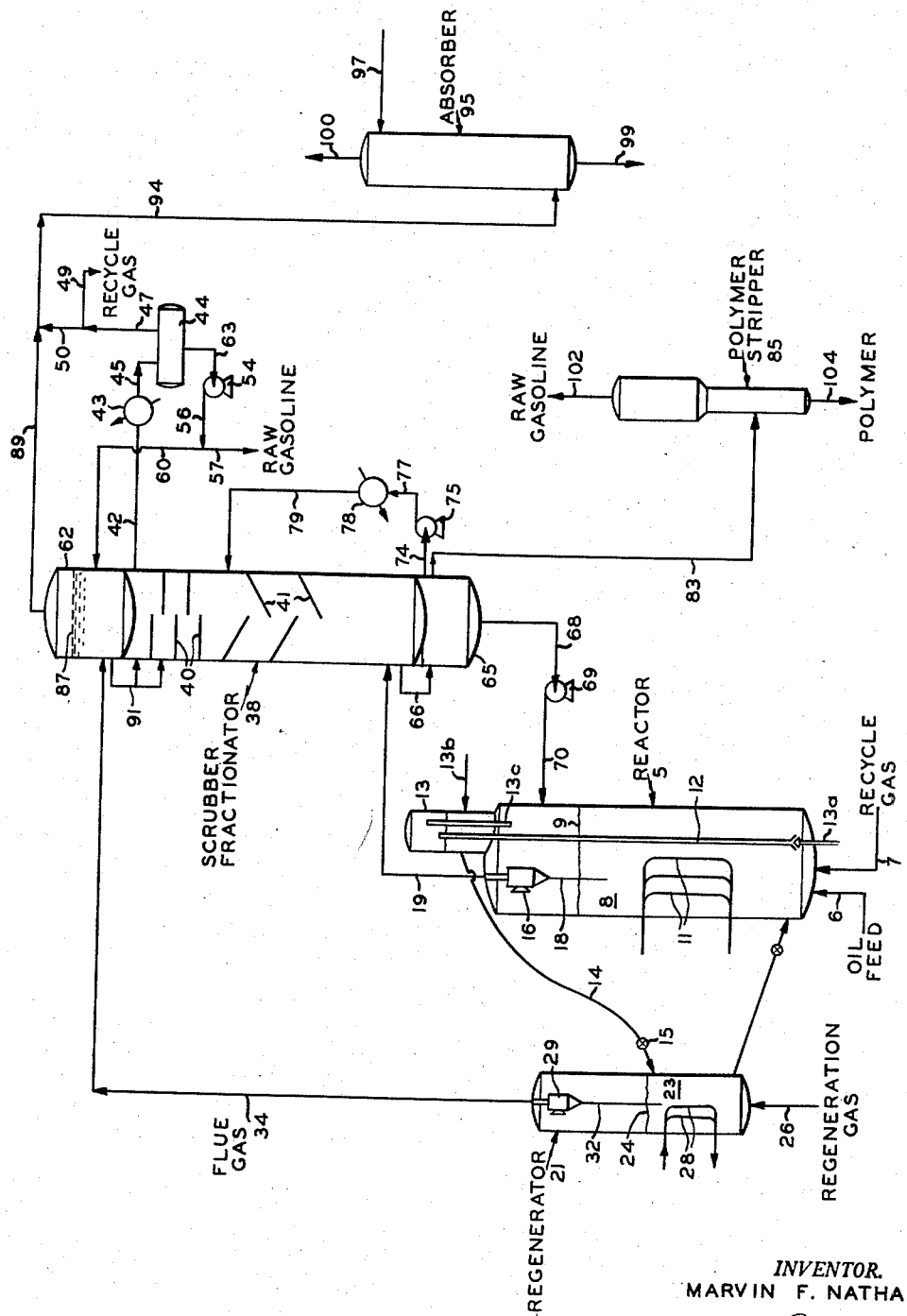
*INVENTOR.*
MARVIN F. NATHAN
BY G. H. Palmer
James E. Bryan
ATTORNEYS

United States Patent Office 2,918,424
Patented Dec. 22, 1959

2,918,424

RECOVERY OF CATALYST FINES ENTRAINED IN THE REACTION EFFLUENT AND REGENERATION EFFLUENT GASES FROM A HYDROCARBON CONVERSION PROCESS

Marvin F. Nathan, New York, N.Y., assignor to The M. W. Kellogg Company, Jersey City, N.J., a corporation of Delaware Application November 25, 1955, Serial No. 549,061

8 Claims. (Cl. 208—140)

This invention relates to an improved method of recovering finely divided solid material which is entrained in a gaseous or vaporous material, and more particularly, it pertains to a method of recovering catalysts fines which are entrained in flue gas and vaporous reaction product in a hydrocarbon conversion system involving regeneration.

In fluid systems, it is customary to employ cyclones for the purpose of recovering catalyst fines which are entrained in the effluent streams from various processing zones, but notwithstanding the high efficiencies of the various cyclones, there is still a small quantity of catalyst which is contained in the effluent materials being discharged from the processing zones. With some types of catalysts, the loss does not represent a significant quantity and, therefore, it can be tolerated. On the other hand, with some types of catalysts such as the noble metals, e.g., platinum or alumina, the loss is significant enough to dictate against a fluid system utilizing a platinum catalyst unless the loss can be reduced. Accordingly, investigations are being conducted at the present time in order to develop methods whereby the loss of catalyst due to entrainment in the effluent product streams can be substantially reduced in order that the fluid method of operation will be more attractive when using expensive types of catalytic materials.

In accordance with this invention, a chemical process is provided in which a chemical reactant is converted to a product including a high boiling normally liquid material and a relatively lower boiling normally liquid material, and the finely divided solid material which is contacted with the chemical reactant becomes contaminated with a combustible material, thus necessitating the passage of the solid material to a regeneration zone wherein it is contacted with a regeneration gas to remove the combustible deposits and thus produce a flue gas. The product streams from each of the aforesaid zones contain finely divided solid material entrained therein, the reaction product being treated so that at least a portion of the high boiling material is condensed, and the high boiling liquid condensate is employed to scrub fines from the reaction product in a first scrubbing zone. The relatively lower boiling normally liquid material is also at least partially condensed, the lower boiling liquid condensate being employed to scrub catalyst fines from the flue gas in a second scrubbing zone. A slurry of solids in liquid material is separated from a substantial amount of the liquid material which is substantially free of solids and the slurry of solid material is recycled to the zone wherein the chemical reactant is converted.

The present invention is applicable to any fluid system in which two processing zones are involved, and one of the zones involves a regeneration treatment of the solid material by the removal of combustible deposits therefrom. A fluid hydrocarbon conversion system is especially adapted to the improvements afforded by the present invention. The hydrocarbon conversion process is, for example, desulfurization, catalytic cracking, dehydrogenation, hydrogenation, cracking under hydrogen pressure, aromatization, alkylation, and the like. Among the various kinds of processes of the hydrocarbon conversion type, the present invention is particularly applicable to a hydroforming system using a platinum type of catalyst. Platinum catalysts are expensive to manufacture and, therefore, it is essential that the catalyst loss be kept to a minimum.

The method of the present invention will be described in connection with a hydroforming operation, however, it should be understood that it has broader applicability. In the hydroforming operation, the catalytic material can have a particle size of about 0 to about 250 microns, more usually, about 10 to about 100 microns. The passage of reactant materials through masses of finely divided material is controlled by providing a dense phase type of operation. The quantity of oil feed which is charged to the reforming zone relative to the quantity of catalyst present therein is measured as the weight space velocity, $W_o/hr./W_c$. In this case, the weight space velocity can be about 0.05 to about 20, generally, in the case of a platinum type catalyst, about 0.1 to about 10, preferably, about 0.25 to about 5.0. The temperature at which the reforming reaction takes place is about 825° to about 1050° F., generally, about 875° to about 975° F. The total pressure of the operation varies within the range of about 25 to about 1000 p.s.i.g., although generally, a pressure of about 200 to about 750 p.s.i.g. is employed. By virtue of the conditions obtaining in the reaction zone, the catalyst becomes contaminated with carbonaceous material and, therefore, it is necessary to subject the same to a regeneration treatment for revivification of the catalyst. To effect this purpose, the catalyst is withdrawn from the reforming zone at a catalyst to oil ratio, on a weight basis, of about 0.001 to about 12, although generally, in the case of a platinum catalyst, the catalyst to oil ratio is about 0.01 to about 2, preferably, about 0.02 to about 1.0. The reforming reaction is conducted in the presence of added hydrogen and the hydrogen is measured as standard cubic feet per barrel of oil feed, 60° F. and 760 mm. Hg, one barrel being equal to 42 gallons, abbreviated as s.c.f.b. Generally, the hydrogen rate varies from about 500 to about 15,000 s.c.f.b., preferably, about 1500 to about 10,000 s.c.f.b.

The catalyst employed in the reforming reaction can be any suitable material having hydrogenation-dehydrogenation properties or aromatization properties. The catalyst can be a compound of a metal of groups V and/or VI of the periodic table, more particularly, the oxides and/or sulfides of the left hand elements of group VI of the periodic table, namely, molybdenum, chromium, vanadium and/or tungsten. An important class of catalysts which can be used as the catalytic material are the noble metals, e.g., platinum, palladium, and the like. The noble metals possess excellent properties for the reforming reaction, however, they are expensive to manufacture. In general, the catalytic element comprises about 0.05 to about 25 percent by weight of the total catalytic material. In connection with the noble metal catalysts, the catalytic element, e.g., platinum, comprises about 0.05 to about 10 percent by weight of the catalytic material, preferably, about 0.1 to about 2 percent by weight on the same basis. The catalytic element is usually supported on a carrier material, such as alumina, silica-alumina, silica-magnesia, alumina-boria, zinc spinel, activated charcoal, magnesia, kieselguhr, pumice, and the like.

The feed material to be processed in the reforming operation is a light hydrocarbon oil, e.g., gasoline, naphtha and/or kerosene. This feed material has an initial boiling point of about 75° to about 260° F. and an end point of about 330° to about 480° F. In the case of platinum catalysts, it is preferred to use a feed material which has an initial boiling point of at least 200° F. and an end point not greater than about 385° F. The feed material can be derived from a straight run operation or a cracking operation, operated thermally or catalytically, or may be a mixture of straight run and cracked materials. Accordingly, the feed material can have an olefin concentration of 0 to about 50 mol percent and an octane number of about 10 to about 70. The sulfur concentration of the feed, when using sulfur resistant catalysts, can vary over a wide range, for example, about 0.01 to about 2.5 percent by weight, whereas in the case of a sulfur sensitive catalyst such as a platinum catalyst, the sulfur concentration should be preferably not greater than 0.03 percent by weight. The paraffinicity of the feed stock can be designated as the Watson characterization factor. This feed material can have a Watson factor of about 11.0 to about 12.2.

The process streams to be treated for removal of entrained solid material generally contain about 2 to 100 grams of solids per cubic foot of vaporous or gaseous material, generally, about 5 to 90 grams, on the same basis.

The following description of the process, in connection with the drawing, includes a specific example of the invention.

*Example 1*

Referring to the accompanying drawing, which is a diagrammatic illustration of apparatus in elevation, a vaporous oil feed comprising a naphtha having an initial boiling point of about 201° F., an end point of 380° F. and a gravity of about 50.6° API, is introduced into the bottom of the reactor 5 by means of the line 6 at a temperature of about 925° F. Hydrogen containing gas or recycle gas is also introduced into the bottom of the reactor 5 by means of the line 7 at the rate of about 4000 s.c.f.b. The recycle gas contains about 90 percent by volume of hydrogen and it is fed to the reactor at a temperature of 1150° F. The reactor is a vertical, cylindrical vessel containing a fluid bed 8 which has an upper level 9. The quantity of catalyst which is present in the reactor is sufficient to provide a weight space velocity of 2.5. The temperature in the reactor is maintained at 910° F. and the total pressure at 200 p.s.i.g. Because of the highly endothermic nature of the operation, heat is supplied to the reactor by heating means designated as 11.

As a result of converting the naphtha to a high octane quality gasoline product, carbonaceous material is deposited on the catalyst. The average coke concentration of the catalyst in the reactor is about 1.0 percent by weight based on the total catalyst. The spent catalyst is passed upwardly in the spent catalyst riser 12, which extends from a point near the bottom of the reactor to a stripping zone 13 mounted on the top of the reactor, by means of a hydrogen containing gas, such as recycle gas, which is introduced through the hollow plug valve 13a located at the lower open end of the riser 12.

The spent catalyst is discharged from the riser 12 into the stripper 13 and forms a dense fluidized bed therein. Stripping gas, such as hydrogen containing gas or recycle gas, flue gas, nitrogen, and the like, is introduced into the stripper through the line 13b. The volatile combustible material is stripped from the catalyst and combined with the stripping gas, after which it passes to the free space of the reactor 5 through a conduit 13c which connects the stripper and the reactor. The stripped catalyst is withdrawn from the stripper through the transfer line 14 which has the slide valve 15 therein for the purpose of automatically controlling the rate of catalyst withdrawal.

The vaporous reaction product, containing gasoline of high octane quality, polymer boiling above the gasoline range and having an initial boiling point of about 375° to about 435° F., specifically 400° F., normally gaseous product material and entrained catalyst fines, is passed to a cyclone separator 16 which is present in the upper part of reactor 5. The separation of vaporous fines from vaporous reaction product is effected in the cyclone and the recovered catalyst fines are returned to dense bed 8 by means of the dipleg 18. A small but significant quantity of platinum catalyst is discharged from the reactor with the reaction product through the line 19. The catalyst used in this specific embodiment is platinum supported on alumina and the platinum concentration is about 0.6 percent by weight, based on the total material.

The contaminated catalyst which is withdrawn from the reactor by means of the transfer line 14 is passed to a regenerator 21; a dense bed 23 of catalyst within the regenerator has the level 24. Regeneration gas comprising 2 percent by volume of oxygen is fed into the bottom of the regenerator through the line 26. The temperature of regeneration is maintained at 1000° F. and the pressure at about 210 p.s.i.g. The heat of combustion is partially removed by the cooling means 28. The flue gas which is produced as a result of the combustion of carbonaceous material is first passed through a cyclone 29 and the separated catalyst is returned to the dense bed 23 through the dipleg 32 and the flue gas is discharged from the regenerator through the line 34. The flue gas contains entrained platinum catalyst.

The vaporous reaction product which is flowing through the line 19 passes into a scrubber-fractionator 38. The upper part of this vessel constitutes a fractionating section and has the fractionating plates 40. The lower portion of the vessel 38 contains slanting baffles 41 which serve as a scrubbing section. Because of liquid polymer cascading downwardly over the baffles 41, virtually all of the liquid polymer in the product is condensed. Accordingly, the temperature in the bottom of the scrubber is at 400° F., and, in addition to condensing the polymer in the reaction product, all of the catalyst fines are scrubbed with the liquid polymer. The uncondensed portion of the reaction product passes upwardly to the fractionation section wherein any polymer contained in the vaporous material is fractionated therefrom. The uncondensed product material is discharged from the upper end of the tower 38 through the line 42, and it is first cooled in the cooler 43, to condense the normally liquid material, and is then passed to a separator 44 through the line 45. The normally gaseous product material, containing hydrogen, normally gaseous hydrocarbons and some normally liquid hydrocarbons, is discharged overhead from the separator 44 through the line 47.

A portion of this normally gaseous product material serves as recycle gas and, therefore, it is passed through the line 49 at a rate sufficient to furnish the hydrogen to be fed to the reactor 5 through the line 7. The net production of normally gaseous product material is passed through the line 50. The liquid product in the separator 44 is withdrawn from the bottom thereof by means of the line 63, and it is transferred by the pump 54 through the line 56.

A portion of the liquid product, which is raw gasoline, is withdrawn from the system through the line 57, and the remainder is passed through the line 60 and thence to a flue gas scrubber 62 which is mounted on vessel 38. In the bottom of the vessel 38, a slurry of catalyst fines in polymer is present and this material is passed to the settler 65 by means of the line 66. In the settler, the slurry of fines is permitted to stand so that a supernatant liquid polymer forms and a high concentration of catalyst fines is present in the slurry fraction. The slurry of catalyst fines is withdrawn from the bottom of the settler through the line 68, and is transferred by the pump 69 through the line 70 to the top of the reactor 5.

Supernatant polymer is withdrawn from the settler through the line 74, and is transferred by the pump 75 through the line 77, the cooler 78 and the line 79 to the vessel 38 at a point just above the slanting baffles 41. This polymer recycle serves as the scrubbing and condensing means for the incoming gaseous product. For the purpose of this invention, the recycle rate of polymer is about one barrel to 1000 to about 5000, preferably 1500 to about 3500 cubic feet of vaporous reaction products entering the vessel 38. Further, the temperature of the polymer is adjusted to about 60° F. to about 250° F., preferably about 80° F. to about 150° F., prior to being recycled to the scrubbing zone. The net production of polymer-containing gasoline, as a result of the crude separation in the scrubbing-fractionating zone, is yielded from the settler through the line 83 and is passed to a polymer stripper 85.

The flue gas containing entrained catalyst fines is passed to the scrubber 62. In this scrubber, a pool 87 of raw gasoline is maintained in order that the flue gas can bubble therethrough and thus undergo treatment for the removal of catalyst fines. The flue gas substantially free of catalyst fines is discharged from the scrubber 62 through the line 89, and the slurry of fines in raw gasoline is withdrawn from the bottom of the scrubber 62 through the line 91 and is passed to the top of the vessel 38. Since the flue gas is passed through raw gasoline serving as the scrubbing means, the flue gas in the line 89 contains vaporized raw gasoline. In addition, normally gaseous reaction product, which is produced in the system and is flowing through the line 50 also contains vaporized gasoline product. The flue gas and normally gaseous product material are combined as a single stream which passes through the line 94. In order to recover the gasoline product from this stream, it is passed to an absorber 95 wherein a suitable hydrocarbon material, such as feed polymer or other hydrocarbon oil, serves as the absorbent. The absorbent is charged to the top of the absorber by means of the line 97 and flows in countercurrent relation with the upflowing gaseous material. The enriched absorbent is discharged from the bottom of the absorber through the line 99 and the gaseous material, denuded of gasoline, is withdrawn from the top of the absorber through the line 100.

The raw polymer flowing from the settler through the line 83 is passed to the polymer stripper 85. In the polymer stripper, heat is supplied to the polymer and thus gasoline is stripped therefrom and withdrawn overhead through the line 102. The stripped polymer is discharged as a liquid from the bottom of the stripper through the line 104. This stream represents the net production of polymer in the hydroforming system.

The quantity of raw gasoline which is passed to the scrubber 62 is sufficient to remove substantially all of the catalyst fines from the flue gas. Accordingly, in general, one barrel to about 10 to about 5000, preferably to about 50 to about 3000 cubic feet of flue gas are employed for this purpose. The temperature in the scrubber 62 is maintained at about 80 to about 150° F., preferably about 100 to about 120° F. It is preferred that the temperature be maintained at a low level in order to reduce the quantity of gasoline which is vaporized and carried out with the scrubbed flue gas. To accomplish this purpose, if desired, a cooler can be employed for the purpose of cooling the flue gas flowing in the line 34 prior to charging the same to the scrubber 62. In connection with the scrubber 38, the temperature at the top of the tower wherein fractionation is effected is maintained at about 250 to about 400° F., preferably about 300 to about 350° F. At the bottom of this tower, the temperature is maintained at about 300 to about 500° F., preferably about 350 to about 450° F. In the case of the scrubbers 38 and 62, it is preferred to maintain a superatmospheric pressure in the neighborhood of the reaction pressure, i.e., in the range of about 25 to about 1000 p.s.i.g., in order to maintain the volume of gas being processed at a minimum.

It will be obvious to those skilled in the art that many modifications may be made within the scope of the present invention without departing from the spirit thereof, and the invention includes all such modifications.

I claim:

1. In a hydrocarbon conversion process wherein a reaction effluent and a regeneration effluent are produced, each containing entrained finely devided solid material, said recation effluent is introduced into a first scrubbing zone and subjected to partial condensation to form a low-boiling vaporous fraction free of entrained solids and a high-boiling condensate containing solids, and said low-boiling vaporous fraction is withdrawn from said first scrubbing zone and condensed, the improvement for recovering and concentrating said solids which comprises: scrubbing said regeneration effluent containing solids with said low-boiling condensate in a second scrubbing zone; withdrawing regeneration effluent free from solids from said second scrubbing zone; withdrawing low-boiling condensate containing solids from said second scrubbing zone; passing said low-boiling condensate containing solids withdrawn from said second scrubbing zone to said first scrubbing zone as reflux thereto, whereby separated solids from said reaction effluent and said regeneration effluent are concentrated in said high-boiling condensate; and withdrawing solids thus concentrated from said first scrubbing zone.

2. The process of claim 1 in which the high-boiling condensate comprises polymer.

3. The process of claim 1 in which the low-boiling condensate comprises gasoline.

4. The process of claim 1 in which the entrained finely divided solid material comprises platinum.

5. In a hydrocarbon conversion process wherein a reaction effluent and a regeneration effluent are produced, each containing entrained finely divided solid material, said reaction effluent is introduced into a first scrubbing zone and subjected to partial condensation to form a low-boiling vaporous fraction free of entrained solids and a high-boiling condensate containing solids, and said low-boiling vaporous fraction is withdrawn from said first scrubbing zone and condensed, the improvement for recovering and concentrating said solids which comprises: scrubbing said regeneration effluent containing solids with said low-boiling condensate in a second scrubbing zone; withdrawing regeneration effluent free from solids from said second scrubbing zone; withdrawing low-boiling condensate containing solids from said second scrubbing zone; passing said low-boiling condensate containing solids withdrawn from said second scrubbing zone to said first scrubbing zone as reflux thereto, whereby separated solids from said reaction effluent and said regeneration effluent are concentrated in said high-boiling condensate; withdrawing solids thus concentrated from said first scrubbing zone; and recycling concentrated solids thus withdrawn to the hydrocarbon conversion zone.

6. In a hydroforming process employing a fluidized mass of finely divided hydroforming catalyst wherein a reaction effluent and a regeneration effluent are produced, each containing entrained finely divided solid material, said reaction effluent is introduced into a first scrubbing zone and subjected to partial condensation to form a low-boiling vaporous fraction free of entrained solids and a high boiling condensate containing solids, and said low-boiling vaporous fraction is withdrawn from said first scrubbing zone and condensed, the improvement for recovering and concentrating said solids which comprises: scrubbing said regeneration effluent containing solids with said low-boiling condensate in a second scrubbing zone; withdrawing regeneration effluent free from solids from said second scrubbing zone; withdrawing low-boiling condensate containing solids from said second scrubbing zone; passing said low-boiling condensate containing solids withdrawn from said second scrubbing zone to said first scrubbing zone as reflux thereto, whereby separated solids from said reaction effluent and said regeneration effluent are concentrated in said high-boiling condensate; and withdrawing solids thus concentrated from said first scrubbing zone.

7. In a hydroforming process employing a fluidized mass of finely divided platinum catalyst wherein a reaction effluent and a regeneration effluent are produced, each containing entrained finely divided solid material, said reaction effluent is introduced into a first scrubbing zone and subjected to partial condensation to form a low-boiling vaporous fraction free of entrained solids and comprising gasoline and a high-boiling condensate containing solids and comprising polymer, and said low-boiling vaporous fraction is withdrawn from said first scrubbing zone and condensed, the improvement for recovering and concentrating said solids which comprises: scrubbing said regeneration effluent containing solids with said low-boiling condensate in a second scrubbing zone; withdrawing regeneration effluent free from solids from said second scrubbing zone; withdrawing low-boiling condensate containing solids from said second scrubbing zone; passing said low-boiling condensate containing solids withdrawn from said second scrubbing zone to said first scrubbing zone as reflux thereto, whereby separated solids from said reaction effluent and said regeneration effluent are concentrated in said high-boiling condensate; and withdrawing solids thus concentrated from said first scrubbing zone.

8. In a hydroforming process employing a fluidized mass of finely divided platinum catalyst wherein a reaction effluent and a regeneration effluent are produced, each containing entrained finely divided solid material, said reaction effluent is introduced into a first scrubbing zone and subjected to partial condensation to form a low-boiling vaporous fraction free of entrained solids and comprising gasoline and a high-boiling condensate containing solids and comprising polymer, and said low-boiling vaporous fraction is withdrawn from said first scrubbing zone and condensed, the improvement for recovering and concentrating said solids which comprises: scrubbing said regeneration effluent containing solids with said low-boiling condensate in a second scrubbing zone; withdrawing regeneration effluent free from solids from said second scrubbing zone; withdrawing low-boiling condensate containing solids from said second scrubbing zone; passing said low-boiling condensate containing solids withdrawn from said second scrubbing zone to said first scrubbing zone as reflux thereto, whereby separated solids from said reaction effluent and said regeneration effluent are concentrated in said high-boiling condensate; withdrawing solids thus concentrated from said first scrubbing zone; and recycling concentrated solids thus withdrawn to the hydroforming zone.

References Cited in the file of this patent

UNITED STATES PATENTS

| | | |
|---|---|---|
| 2,449,095 | Wheeler et al. | Sept. 14, 1948 |
| 2,665,239 | Howard et al. | Jan. 5, 1954 |
| 2,765,262 | Weikart | Oct. 2, 1956 |